May 14, 1929.                J. KÜBLER                1,712,504
CONVERSION OF ELECTRIC CURRENTS
Filed Aug. 31, 1921        2 Sheets-Sheet 1

Inventor
J. Kübler,
By Marks&Clerk
Attys.

Patented May 14, 1929.

1,712,504

UNITED STATES PATENT OFFICE.

JOHANN KÜBLER, OF BADEN, SWITZERLAND, ASSIGNOR TO AKTIENGESELLSCHAFT BROWN, BOVERI & CIE., OF BADEN, SWITZERLAND.

CONVERSION OF ELECTRIC CURRENTS.

Application filed August 31, 1921, Serial No. 497,431, and in Germany May 18, 1916.

In metallic vapour or similar rectifiers comprising a plurality of anodes, it is well known that at any one time only that anode or anode group carries current whose potential is higher than the potential of all the other anodes. Consequently in rectifiers fed with polyphase current the time during which the current is carried per alternating current period by each anode is inversely proportional to the number of phases, that is to say, if the rectifier for example is fed with three-phase current, the time during which the current is carried will be equal to the third part of a period, and if the rectifier is fed with six-phase current, the time during which current is carried will be equal to the sixth part of a period. The result of this is that the feeding transformers are inefficiently utilized, and higher harmonies are induced in their primaries which in some cases may have an injurious action upon the working of the rectifier, unless special measures are taken to prevent the entrance of such waves into the supply circuit.

According to this invention the positive half of a voltage curve which does not differ too much from sine form is being utilized in its full extent in the following manner: At any given moment, a part of that phase winding which carries current is made to cooperate with a combination of parts of other phase windings. This combination of parts may be connected to the aforesaid part either in series or in parallel; in the latter case the result obtained by superposition of the individual voltage curves of each element will be a voltage curve coinciding with that produced by the first mentioned part.

The manner in which the combining of the portions of the winding may be effected will now be explained with reference to the example of a parallel-connection of the portions of the winding when the rectifier is fed with six-phase current. To the six vectors I–VI of Figure 1 there correspond the six current curves I–VI shown in Figure 2, of which I and IV are shown in dotted lines, II and V are shown in dash and dot lines, and III and VI are shown in full lines. In the ordinary mode of connection each anode, and therefore each secondary transformer winding phase, would carry current only during the sixth part of a period, $AB = \frac{i}{6}$, and during this time the voltage of this anode is greater than that of the remaining anodes.

Figure 1:
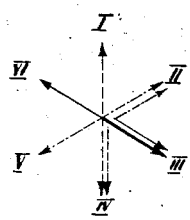
Fig. 1 is a vector diagram of a six-phase current.
Figure 2:
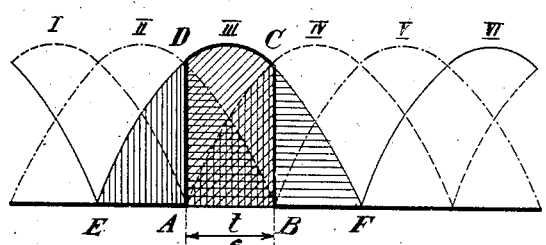
Fig. 2 is a diagram of the current curves.

In Figure 2 the curve of the current of phase III is shown in full lines and the area ABCD which is enclosed by the current curve is shown hatched with slanting lines. It is, however, known that in a sine curve the summation of the ordinates of the part areas ABC (hatched with vertical lines) and BAD (hatched with horizontal lines) of the adjacent sine curves IV and II will equal the summation of the ordinates of the area ABCD of the sine curve III. Therefore, in Figure 1 the vector III can also be obtained by the geometrical addition of the vectors II and IV, and vector II can be obtained by the addition of vectors I and III, etc. Now if the case of a rectifier is considered from this point of view, then it will be possible to allow three portions (instead of only one portion) of the winding of the feeding transformer to carry current simultaneously at any time, or which is the same, to utilize the whole of the positive portion of a sine curve instead of only its middle third. Namely, since this process is applied successively to all the phases of the winding, the phase III for example will carry current not only during the time AB (Figure 2), but also previously during the time EA it will carry the current ED (vertical hatching), and afterwards during the time BF it will carry the current CF (horizontal hatching).

Figure 3:
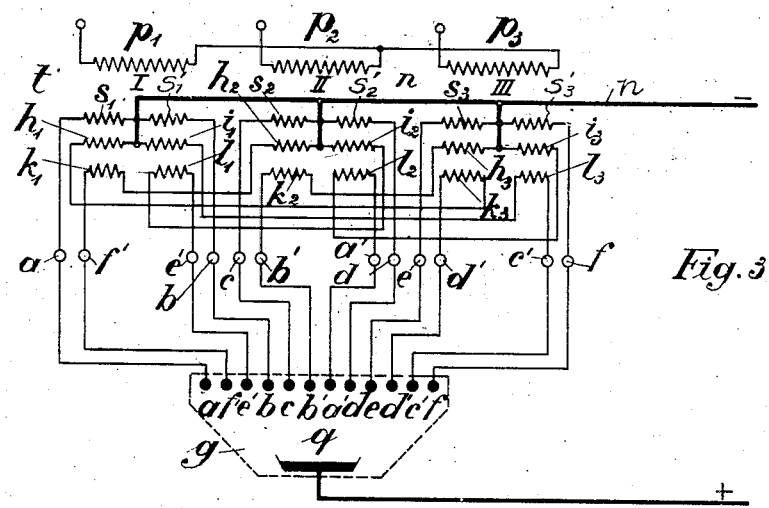
Fig. 3 is a diagrammatic view of one arrangement of connections in accordance with the invention.

Figure 3 shows a diagram of electrical connections which represents the most simple practical solution of the above stated problem in the case of a rectifier $g$ that is fed with six-phase current from a three-phase net. The star-connected primaries $p_1$ $p_2$ $p_3$ of the feeding transformer $t$ are connected to the net. The secondaries $s_1$ $s_2$ $s_3$ $s_1'$, $s_2'$, $s_3'$, have acquired the six-phase character by tapping connections at the middles $s_1$—$s_1'$, $s_2$—$s_2'$, $s_3$—$s_3'$. The tapping connections are connected together, and they form the star point $n$ of the six-phase system and constitute at the same time the negative pole of the direct current net whose positive pole is constituted by the cathode $q$ of the rectifier $g$. The ends of the secondaries $s_1$, $s_2$, etc., lead to six terminals, $a$, $b$, $c$, $d$, $e$, $f$, which are connected to six similarly designated anodes of the rectifier $g$.

Now in order to completely utilize the positive portion of the sine curve, the transformer is provided per core with four auxiliary windings $h, i, k, l$, which are similar to one another and which are connected in pairs in series in the manner determined by the diagram Figure 1, and are led to six further anodes $a'$ $b'$ $c'$ $d'$ $e'$ $f'$, see Figure 3. These auxiliary anodes operate simultaneously with and parallel to the main anodes $a$—$f$. From Figures 1 and 2 it will be perceived that the series-connected auxiliary windings of the adjacent two phases must be in operation always simultaneously with the main winding of a phase. The auxiliary windings must therefore be connected together in a kind of zigzag connection.

In the diagram Figure 3 the winding $s_1$ on the left half of phase I, which is connected to the anode $a$, is shown for example in simultaneous operation with the winding $i_3$ of phase III, and the winding $l_2$ of phase II, the outer terminal $a'$ of which is connected to the similarly designated anode $a'$, while the inner terminal of winding $i_3$ is connected to the neutral point $n$.

In the foregoing arrangement, there are thus two distinct sets of secondary transformer windings, each connected to a distinct set of anodes. In one set, the rectifier anodes are connected to the end terminals of six star-connected straight phase windings, the windings of each phase being on a single core and being induced by primary windings of a single phase. In the other set, the rectifier anodes are connected to six star-connected zigzag or interconnected phase windings, the windings of each phase being composed of winding elements disposed on two different transformer cores and induced by primary windings of more than one phase, two such winding elements of different primary phases being interconnected in zigzag. The two sets of transformer and rectifier apparatus operate on the load in parallel.

Figure 4:
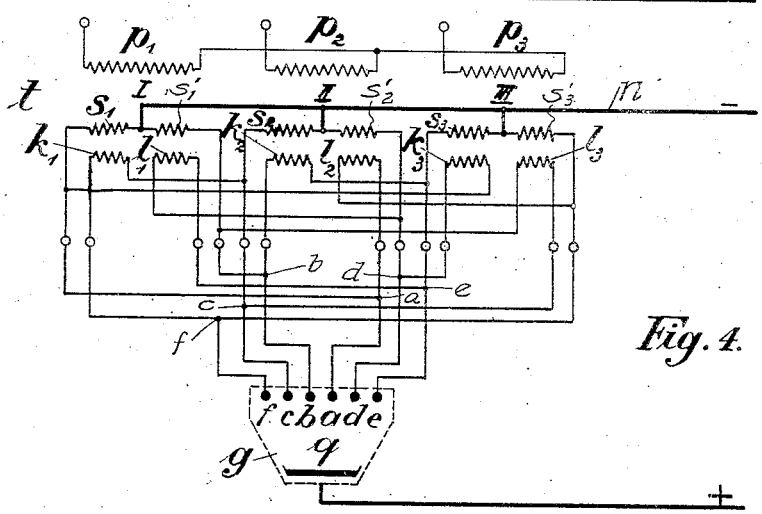
Fig. 4 is a similar view of a slightly modified arrangement.

The arrangement shown in Figure 3 can be simplified in two respects, as shown in Fig. 4. In the first place the auxiliary windings $h$ and $i$ (on the transformer $t$) that are connected to the neutral point $n$ may be omitted, by transferring their functions to the secondary main windings $s$; in this way the windings $s$ are better utilized.

Secondly, the auxiliary anodes $a'$—$f'$ may be omitted by connecting the simultaneously operating transformer windings to a single anode for the time being. Both simplified arrangements are illustrated in the diagram Figure 4.

| The anode | is fed on the one hand from | and on the other hand from |
|---|---|---|
| $a$ | $s_1$ | $s_3' + l_2$ |
| $b$ | $s_1$ | $s_3' + k_2$ |
| $c$ | $s_2$ | $s_1' + l_3$ |
| $d$ | $s_2$ | $s_1' + k_3$ |
| $e$ | $s_3$ | $s_2' + l_1$ |
| $f$ | $s_3$ | $s_2' + k_1$ |

The outer terminals of the secondary windings of the feeding transformer $t$ are again marked $a, b, c, d, e, f$.

In this case, the secondary windings of the transformer comprise a plurality of phase winding elements, of the primary or basal phases, connected in mesh into a closed polygon, with a set of similar winding elements connected in star, and interconnecting diagonally the corners of the polygon. Or, expressing it differently, a set of star-connected phase windings has the star end terminals interconnected by an additional set of windings of suitable phase.

If the form of the curve differs from the sine form it is possible that the addition or sum of the two triangular curve portions no longer produces the middle rectangular curve portion, and in such a case again only one of the two anodes connected in parallel in the diagram Figure 3, is in operation. This drawback can be removed either by interlinking the current circuits of every two parallel-connected anodes or portions of the winding of the feeding transformer by means of a current transformer or by giving them a high self-induction which may be provided either in separate choking coils or in the feeding transformer itself.

Figure 5:
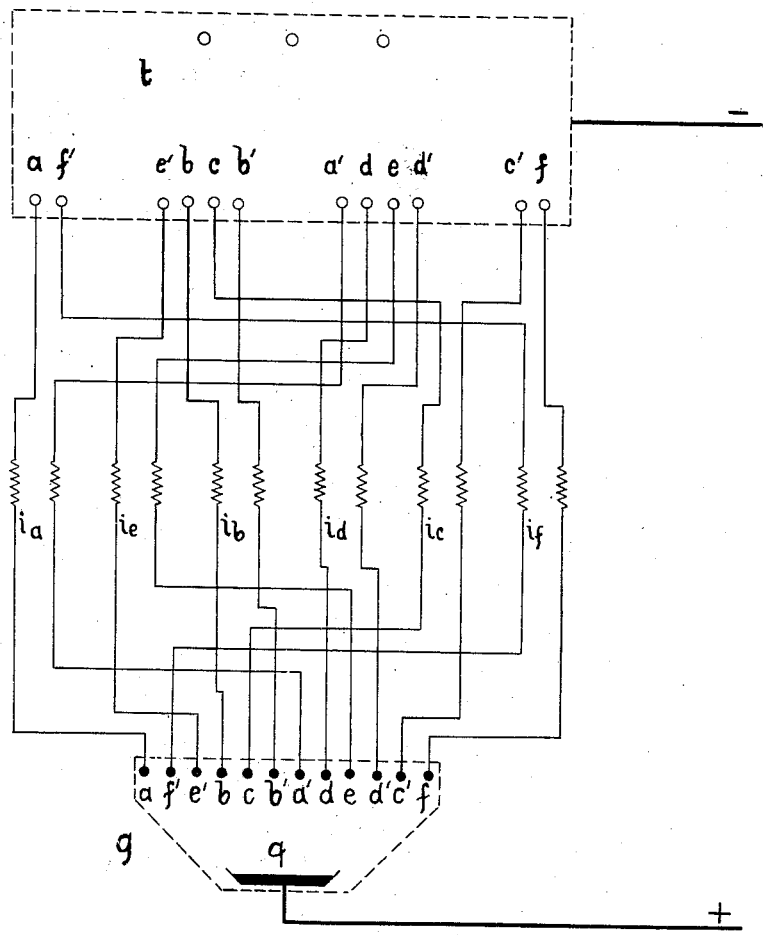
Fig. 5 illustrates a modification of the invention wherein current transformers interlink the parallel connected anode circuits and wherein choking coils add to the self-induction of the anode circuits.

The manner in which the interlinking of the parallel-connected anode circuits can be effected by means of current transformers in an arrangement according to Figure 3 is shown in Figure 5 in which the winding of the transformer is omitted, and only its terminals are drawn in. The currents leading to the anodes $a, a', b, b'$ to $f, f'$ working in parallel are interlinked with one another by six transformers $i_a$ to $i_t$ of the transformation ratio 1:1.

If the windings marked $i_a$ to $i_t$ be viewed as separate choking coils, not mutually interlinked, this arrangement forms an illustration of the constructional example above mentioned with increased self-induction of the anode circuits.

Instead of arranging the auxiliary windings on the feeding transformer they may be arranged on a separate auxiliary transformer.

This invention may be applied to only a portion of the anodes instead of to all the anodes.

Having now described my invention what I claim as new and desire to secure by Letters Patent is:—

1. A method of utilizing the full extent of the positive half of the voltage curve in rectifiers fed with polyphase transformers which consists in energizing the temporarily active rectifying phase with power from the associated main phase winding and also with power from a combination of series-connected windings of other phases.

2. A method according to claim 1 wherein the voltage of the combination of series-connected windings is at any moment equal to that of the main phase winding.

3. A method according to claim 1 wherein six-phase current is supplied to the rectifier and the combination of series-connected windings is constituted by windings of the two phases adjacent to the main phase.

4. A method according to claim 1 wherein the combination of series-connected windings of other phases is constituted in part by the other temporarily inactive main phase windings.

5. A method according to claim 1 wherein the respective cooperating energizing circuits are interlinked by means of a current transformer.

6. In a rectifier installation, the combination with a polyphase line, a direct current line, and a polyphase rectifying device, of a transformer interconnecting said device and said lines, said transformer comprising primary windings connected to said polyphase line and secondary windings connected to said rectifier, said transformer being so arranged that the rectifying currents flowing in the secondary windings cause the primary windings of each phase to carry current throughout the entire duration of each alternation.

7. The combination with a polyphase line, a direct current line and a polyphase rectifier interconnecting said lines, of a transformer having polyphase primary windings connected to said alternating current line and secondary windings connected to the phases of said rectifier so arranged that the waves of the voltage applied to the phases of the rectifier overlap causing each rectifier phase to derive current from the associated transformer winding only during a fraction of each alternation, and supplemental means for loading the primary windings to cause each primary phase to carry current corresponding to the wave of the applied voltage during substantially each entire alternation.

8. The combination of a polyphase line, a direct current line, a polyphase rectifier, a transformer connecting said rectifier between said alternating current line and said direct current line to convert current between said lines, said transformer causing the current interchanged between said lines to be such that the main current flow between said transformer and said polyphase line does not correspond to the wave of the voltage applied to said transformer, and means for producing a supplemental current flow between said two lines, said supplemental current flow complementing the main current flow so that the wave form of the resultant currents flowing between said transformer and said polyphase line corresponds to the wave of the voltage of said polyphase line.

9. The combination of a polyphase line, a direct current line, and converting apparatus interconnecting said lines, said converting apparatus comprising a plurality of parallel rectifying paths having common, positive and negative terminals connected to said direct current line, each path including a phase winding and a serially-connected, rectifying element, said phase windings constituting a polyphase system, a set of polyphase windings connected to said polyphase line in transformer relation to the phase windings of said rectifying paths, the flow of currents through the phase windings of said rectifying paths tending to produce a flow of current between said polyphase line and the associated polyphase winding that differs materially from the shape of the voltage of said polyphase line, and means for providing a supplemental current flow between said direct current line and said alternating current line to so complement the current flow between said polyphase line and the polyphase winding connected thereto as to cause the resultant current flowing therebetween to have a wave shape corresponding to the voltage wave of said line.

10. The combination with a polyphase line and a direct-current line, of a set of rectifying paths for converting current between said lines so that each of the phases of said polyphase line carries current only during a fraction of the alternation, and a supplemental set of rectifying paths for causing additional current flow complementing said first-mentioned current flow so that the resultant current flowing in each of the phases of said polyphase line corresponds to its voltage wave shape during substantially the entire alternation.

11. The combination with a polyphase line having more than two phases, a transformer having a primary polyphase winding connected to said polyphase line, and a secondary winding having a plurality of star-connected phase windings, a rectifier having a plurality of rectifying elements connected in star to the terminals of said secondary phase windings, and a direct-current line connected between the star point of said rectifying elements and the star point of said secondary phase windings, of supplemental means for producing a additional current flow in each phase of said polyphase line during the period when the corresponding secondary phase winding does not draw a current therefrom.

12. The combination with a polyphase line having more than two phases, a transformer having a primary polyphase winding connected to said polyphase line, and a secondary winding having a plurality of star-connected phase windings, a rectifier having a plurality of rectifying elements connected in star to the terminals of said secondary phase windings, and a direct-current line connected between the star point of said rectifying elements and the star point of said secondary phase windings, of supplemental means for producing an additional current flow in each phase of said line during the period when the corresponding secondary phase winding does not draw a current therefrom, said supplemental current complementing the current drawn by said secondary phase windings to cause the resultant current flowing in each phase of said line to have a wave shape approximating the voltage wave thereof.

13. In a rectifier system, a polyphase line, a direct-current line, a plurality of polyphase star-connected rectifying elements, the star point of said rectifying elements constituting one terminal of said direct-current line, and a transformer apparatus having primary polyphase windings connected to said polyphase line and a plurality of secondary phase windings arranged to constitute two sets of star-connected paths for supplying two parallel currents of the same phase to said rectifier apparatus, each phase of one set being composed of winding elements induced by the same primary phase, and the corresponding phases of the other set being composed of winding elements induced by two different primary phases.

14. In a rectifier system, a polyphase line, a direct-current line, a plurality of star-connected rectifying elements, the star point of said rectifying elements constituting one terminal of said direct-current line, and a transformer having primary phase windings connected to said polyphase line and secondary phase windings connected between the other terminal of said direct-current line and the terminals of said rectifying elements, said secondary windings being arranged to constitute two sets of parallel paths for supplying current to said rectifier elements, each phase of one set comprising winding elements induced by one primary phase only, the corresponding phase of the other set comprising serially-connected winding elements induced by two different other primary phases.

15. In a rectifier system, a polyphase line, a direct-current line, a plurality of star-connected rectifying elements, the star point of said rectifying elements constituting one terminal of said direct-current line, and a transformer having primary phase windings connected to said polyphase line and secondary phase windings connected between the other terminal of said direct-current line and the terminals of said rectifying elements, said secondary windings being arranged to constitute two sets of parallel paths for supplying current to said rectifier elements, each phase of one set comprising winding elements induced by one primary phase only, the corresponding phase of the other set comprising serially-connected winding elements induced by two different other primary phases, the voltage of the corresponding paths in the two different sets being substantially equal in phase and in magnitude.

16. The combination of a three-phase line, a polyphase transformer having three-phase primary windings connected to said line and six-phase secondary windings, said secondary windings being arranged to constitute six star-connected main phase paths, and six star-connected supplemental phase paths, each main phase path comprising winding elements induced by one primary phase, and the corresponding supplemental phase path comprising serially-connected winding elements induced by the two other primary phases.

17. In a rectifier system, a polyphase line, a direct-current line, a plurality of polyphase star-connected rectifying elements, the star point of said rectifying elements constituting one terminal of said direct-current line, a transformer apparatus having primary polyphase windings connected to said polyphase line and a plurality of secondary phase windings arranged to constitute two sets of star-connected paths for supplying two parallel currents of the same phase to said rectifier apparatus, each phase of one set being composed of winding elements induced by the same primary phase, and the corresponding phases of the other set being composed of winding elements induced by two different primary phases, and means for causing simultaneous current flow in the parallel paths.

18. In a rectifier system, a polyphase line, a direct-current line, a plurality of star-connected rectifying elements, the star point of said rectifying elements constituting one terminal of said direct-current line, a transformer having primary phase windings connected to said polyphase line and secondary phase windings connected between the other terminal of said direct-current line and the terminals of said rectifying elements, said secondary windings being arranged to constitute two sets of parallel paths for supplying current to said rectifier elements, each phase of one set comprising winding elements induced by one primary phase only, the corresponding phase of the other set comprising serially-connected winding elements induced by two different other primary phases, and means for magnetically interlinking the parallel paths of said two sets to cause simultaneous current flow therein.

19. The combination of a polyphase line, a direct-current line, a polyphase rectifier comprising a plurality of star-connected rectifying elements, the star point of said rectifying elements constituting one direct-current terminal, a polyphase transformer comprising primary phase windings connected to said polyphase line, and a plurality of secondary phase windings connected in star to the free terminals of said rectifying elements, the star point of said secondary phase windings constituting the other direct-current terminal, each phase of said secondary winding comprising serially-connected winding elements induced by primary windings of two different phases.

20. In a polyphase rectifier installation, a transformer having a relatively low number of primary phase windings, cooperating secondary phase windings constituting a polyphase system having a greater phase number than said primary windings, a plurality of rectifying elements connected in star to the phase terminals of said secondary windings, and a direct-current line connected to the star point of said rectifying elements and the neutral point of said secondary windings, the current applied to each of said star-connected rectifying elements by the associated secondary transformer phase being induced therein by two different primary phases.

21. In a polyphase rectifier installation, a transformer having a relatively low number of primary phase windings, cooperating secondary phase windings constituting a polyphase system having a greater phase number than said primary windings, a plurality of rectifying elements connected in star to the phase terminals of said secondary winding, and a direct current line connected to the star point of said rectifying elements and the neutral point of said secondary windings, the rectifying elements and the associated secondary windings connected between said neutral point and said star point constituting a plurality of paralleled rectifying paths, each path including a rectifying element, and secondary transformer windings induced by primary phase windings of more than one phase.

22. The combination with a polyphase rectifier comprising a cathode, and a plurality of anodes co-operating therewith, of a polyphase transformer for supplying said rectifier comprising a magnetic core means having a relatively small number of basal phases, a star-connected secondary winding on said core means, the star point of said secondary winding constituting one direct-current terminal and the star end points being connected to said anodes, each secondary phase winding comprising winding elements disposed on different phases of said core means.

23. The combination with a polyphase rectifier, of a polyphase transformer for supplying said rectifier, said transformer comprising a star-connected polyphase secondary winding, the star point of said winding constituting one direct-current terminal, and the end points of said winding being connected to the phases of said rectifier, each secondary phase winding of said transformer comprising interconnected winding elements belonging to different phases common in phase with the winding elements of other secondary phases.

24. The combination of a polyphase rectifier, and a polyphase transformer for supplying said rectifier, said transformer comprising a star-connected polyphase winding having a neutral star point constituting one direct-current terminal, the end points of the star being connected to the phases of said rectifier, each secondary phase winding of said transformer comprising interconnected winding elements belonging to different phases common in phase with component winding elements of other secondary phase windings.

25. The combination with a three-phase line, and a polyphase rectifier, having a number of phases which is a multiple of three, a transformer comprising a three-phase core, a primary three-phase winding on said core connected to said line, and a secondary open star-connected polyphase winding on said core, connected to the phases of said rectifier, each phase of said winding group being composed of coils disposed on the same core of said transformer, the end point of each phase of one group having connected thereto a winding element of another phase shifted thereagainst in one direction, and a corresponding phase element of another group having connected thereto a winding element of another phase symmetrically shifted in opposite directions than said first mentioned phase element.

26. The combination with a polyphase rectifier having a cathode and a plurality of anodes cooperating with said cathode, of a transformer for supplying polyphase alternating-current to said anodes, said transformer comprising a plurality of secondary phase windings connected between said anodes and a neutral star point constituting one direct-current terminal, each of said phase windings being composed of winding elements belonging to different component phases, a component phase element of one of said secondary phase windings being common in phase with a component element of another secondary phase winding that is displaced in phase with respect to said first mentioned secondary phase winding by less than 180 degrees.

27. The combination with a polyphase line and a polyphase rectifying device comprising a cathode and a plurality of anodes cooperating with said cathode, of a transformer interconnecting said device with said line, said transformer having a polyphase magnetic core and a plurality of secondary phase windings severally connected between the anodes of said rectifier and a neutral point constituting one direct-current terminal, each secondary winding being composed of serially-interconnected winding elements disposed on different phases of said transformer core.

28. In a rectifying system, a polyphase supply line, rectifier apparatus having anodes greater in number than the number of phases in said line, transformer means providing an operating connection between said line and said apparatus and comprising primary winding means connected to said line and providing phases of number equal to the number of phases of said line and secondary winding means providing rectifier supply phases, and secondary winding units forming part of said secondary winding means and operating to provide for one of said rectifier supply phases, said units being equal in number to the number of said primary phases and each being associated with a primary phase different than that with which the other of said units are associated.

In testimony whereof I have signed my name to this specification.

JOHANN KÜBLER.